United States Patent [19]

Marshall et al.

[11] Patent Number: 5,406,970
[45] Date of Patent: Apr. 18, 1995

[54] CHEMICAL INJECTION SYSTEM

[75] Inventors: Stephen E. Marshall; Mark V. Zeck, both of Snyder, Tex.

[73] Assignee: Y-Z Industries Inc., Snyder, Tex.

[21] Appl. No.: 83,135

[22] Filed: Jun. 25, 1993

[51] Int. Cl.⁶ ............................................. G05D 11/13
[52] U.S. Cl. .................................. 137/101.25; 48/195; 137/561 R
[58] Field of Search ........................... 137/101.25, 561; 48/195

[56] References Cited

U.S. PATENT DOCUMENTS

| | | | |
|---|---|---|---|
| 4,180,083 | 12/1979 | Miyaoka | 137/101.25 |
| 4,436,674 | 3/1984 | McMenamin | 137/101.25 X |
| 4,611,294 | 9/1986 | Stanfill | 137/551 X |
| 5,032,063 | 7/1991 | Zeck et al. | 417/383 |

OTHER PUBLICATIONS

Y-Z Industries, Inc., "NJEX-7000 Odorant Injection System Manual", pp. 1-36, May 18, 1992.

*Primary Examiner*—Robert G. Nilson
*Attorney, Agent, or Firm*—David H. Judson

[57] ABSTRACT

A system for injecting chemicals, e.g., odorants, from a chemical supply into a gas pipeline includes three primary components, a pump for injecting the odorant, a metering device, and a programmable controller. The controller is preferably powered by a solar panel to facilitate use of the system in remote areas for long periods of time. A removable data carrier, such as a memory module, is connected to the controller to collect odorant system event data. The data carrier is removable from the controller and the data therein may be downloaded into an auxiliary audit computer for generation of summary audit reports. The system precisely monitors how much odorant is used per pump stroke and insures that the odorant injection rate remains constant irrespective of environmental or equipment variations which might otherwise cause inaccuracies in the measurement of odorant usage data and/or the fluctuation of the odorant injection rate.

11 Claims, 5 Drawing Sheets

```
Unit Location: xxxxxxxxxxxxxxx              Log Start: xx/xx/xx
Serial No: xxxxxx                           Log End:   xx/xx/xx EVENT           DOU = dialy odorant usage    TIME      DATE
```

| EVENT | TIME | DATE |
|---|---|---|
| >DOU - xxx.x lbs. @ x.xx lbs/mmcf (Set/Calculated Rate) | xx:xx | xx/xx/xx |
| PUMP ALARM - overpump/underpump/failure (xx.x cc/stk) | xx:xx | xx/xx/xx |
| METER ALARM - overfill/slowfill/nofill/cable | xx:xx | xx/xx/xx |
| SIGNAL ALARM - loss of signal/overflow (xx.x %) | xx:xx | xx/xx/xx |
| BATTERY ALARM -low voltage (xx.x vdc) | xx:xx | xx/xx/xx |
| TANK ALARM - low level (xx %) | xx:xx | xx/xx/xx |
| STAND BY - standby | xx:xx | xx/xx/xx |
| LOW FLOW - low flow shut off (xx.x %) | xx:xx | xx/xx/xx |
| SYSTEM START - propflow/proptime | xx:xx | xx/xx/xx |
| PARAMETER CHANGE - pump displacement (xx.x cc/stk) | xx:xx | xx/xx/xx |

```
Alarm Count: xxxx    From: xx/xx/xx (xx:xx)    To: xx/xx/xx (xx:xx)
Avg. Injection Rate: xx.x lbs/mmcf     Low Injection Rate: xx.x lbs/mmcf
Total Odorant Used: xxxxxx.x lbs.      High Injection Rate: xx.x lbs/mmcf
Valid Keys: [Pgdn Pgup Home End]  F1(select) F2(date) F3(alarm) F4(param)
```

FIG. 6

```
SYSTEM PARAMETERS    Settings From: xx:xx xx/xx/xx   To: xx:xx xx/xx/xx

Injection Rate:   xx.xx lbs/mmcf     Pump Displacement:   xx.x cc/stroke
Max. Gas Flow:    xx.xxx mmcf/hr     Odorant Density:     x.xx lbs/gallon
Flow (No Signal): xx.x % MGF         PropTime - Time/Stroke:  xx.xx min
Low Flow Shutoff: xx.x % MGF         Odorant Output Pulse:    xx.x lbs/pul
Flow Input Type:  Analog/NonLin      Odorant Supply Tank Type:  level sw
Zero: 1.0vdc      Span: 5.0vdc       Supply Tank Level Alarm:   xxx %
Disabled Alarms:          None       Max Time/Stoke Limit:  xxx min/stk
```

| EVENT | TIME | DATE |
|---|---|---|
| >DOU - xxx.x lbs. @ x.xx lbs/mmcf (Set/Calculated Rate) | xx:xx | xx/xx/xx |
| PUMP ALARM - overpump/underpump/failure (xx.x cc/stk) | xx:xx | xx/xx/xx |
| METER ALARM - overfill/slowfill/nofill/cable | xx:xx | xx/xx/xx |
| SIGNAL ALARM - loss of signal/overflow (xx.x %) | xx:xx | xx/xx/xx |
| BATTERY ALARM -low voltage (xx.x vdc) | xx:xx | xx/xx/xx |
| TANK ALARM - low level (xx %) | xx:xx | xx/xx/xx |
| STAND BY - standby | xx:xx | xx/xx/xx |
| LOW FLOW - low flow shut off (xx.x %) | xx:xx | xx/xx/xx |
| SYSTEM START - propflow/proptime | xx:xx | xx/xx/xx |
| PARAMETER CHANGE - pump displacement (xx.x cc/stk) | xx:xx | xx/xx/xx |

FIG. 7

CHEMICAL INJECTION SYSTEM

TECHNICAL FIELD

The present invention relates generally to chemical injection systems and more particularly to methods and systems for monitoring and controlling the injection of odorants, corrosion inhibitors, lubricants or other additives into gas pipelines or other fluid conduits.

BACKGROUND OF THE INVENTION

Clean-burning natural gas has become the fuel of choice for millions of consumers around the world because of its versatility and availability. Because natural gas is colorless and odorless, modern natural gas odorization procedures have been established as a means of saving lives and protecting property. By the 1940s, gas odorization was widely endorsed by the industry. It was determined that leak detection would save lives, and legislation was passed requiring the odorization of natural gas. Today, state and federal regulations concerning the odorization of natural gas place a great deal of emphasis on enforcement.

Natural gas odor levels are usually monitored by several techniques, including the room test and the use of a dilution apparatus such as an odor tester, odorometer or odorator. Although there are various procedures involved in odor-level determination, the most common mechanism used in the industry is the human nose. Because the objective is to determine the actual degree of odor, not the amount of odorant, the human olfactory sense continues to serve as the standard of pungency.

Systems for injecting odorants are well known in the prior art. Such systems typically include a pump for injecting an odorant into the pipeline, and some timer or other controller to effect actuation of the pump at predetermined intervals. Because it is important to know the total volume of odorant injected into the pipeline over the period of operation, more sophisticated systems in the art include verification devices to determine the quantity of odorant injected. One such injection system, designated by the Model No. NJEX-7100 and offered by the assignee of the present invention, included a positive-displacement pump for injecting odorant into the pipeline, a controller, a flow switch connected to the outlet side of the odorant pump, and an odorant inlet meter for metering the odorant to the pump. The controller tracked the flow rate of the gas in the pipeline using a flow signal, and this signal was also used to calculate the stroke rate of the pump. Monitoring was achieved by the flow switch and the inlet meter. In particular, the flow switch interfaced to a counter to provide a continuous readout of the number of strokes, and the meter served as an additional monitor by counting the number of times the meter was refilled. From the number of strokes and a preset pump displacement setting (in cc/stroke), the purported volume of odorant injected was calculated. The system also included appropriate alarm circuitry for signaling the user in the event of a malfunction.

While injection systems such as described above provided significant operational advantages and improvements over the prior art techniques and devices, they provided somewhat "coarse" odorant usage data. For example, such systems were not capable of precisely monitoring how much odorant was being used per pump stroke because despite the preset pump displacement setting, the actual odorant displacement per stroke changed due to pump efficiency variations, static pressure variations, check valve performance variations, line debris and variations in the density of the odorant. Such variations caused inaccuracies in the odorant usage data, especially where the system was operating over long periods of time and in harsh environmental conditions. While these systems did provide quantitative raw data for analysis, adjustment and accountability of the odorant usage, they did not have any capability to present such data in any type of useful format to facilitate audit or reporting of system operation. The systems, although quite sufficient for their intended purpose, were also costly and had to be operated by experienced personnel.

Accordingly, there remains a long felt need for improved odorant injection systems which overcome these and other problems associated with the prior art.

BRIEF SUMMARY OF THE INVENTION

It is a primary object of the present invention to provide a total system approach to odorant injection, metering and monitoring to facilitate collection by pipeline operators and others of detailed quantitative data for analysis, adjustment and accountability.

It is further object of the invention to provide such an injection system that is extremely reliable, requires little or no maintenance, is solar-powered and which can be left unattended in harsh environments.

It is still another object of the invention to provide an injection system using a pump and an odorant meter which precisely monitors how much odorant is injected per stroke of the pump. The system precisely monitors how much odorant is used per stroke irrespective of pump efficiency variations, static pressure variations, equipment performance variations, line debris and variations in the density of the odorant, among other factors, which variations or problems might otherwise cause inaccuracies in the measurement of odorant usage data.

It is yet a further object of the invention to provide an injection system using a pump and a temperature-compensated odorant inlet meter which accurately measures and verifies the amount of odorant injected.

It is still another important object of the invention to provide an odorant injection system with an auxiliary audit system comprising a detachable monitor module connected to the system controller, and an audit computer. The module is designed to collect odorant event usage data (e.g., the time and date of each alarm, the time and date of system parameter changes, the actual odorant injected, etc.) over a relatively long period of time, e.g., several months. The monitor module is removed from the system controller at periodic intervals and the data therein downloaded into the audit computer; alternatively, the monitor module may be polled in the field over a telephone or other telecommunications link. The usage data is processed in the audit computer to generate useful displays or reports of injection system events.

It is a further object of the invention to provide in such a system verification of pre-set proportional-to-flow odorization rates, an easy, positive method of odorization documentation and system monitoring and alarm functions capable of notifying the operator in the event of a malfunction.

These and other objects of the invention are provided in a system for injecting odorant from an odorant supply into a gas pipeline. In one embodiment, the system comprises three primary components: a pump, an odorant meter and a controller. The pump has an inlet, and an outlet connectable to the gas pipeline. The odorant meter supports a predetermined volume of odorant and has an inlet connected to receive odorant from the odorant supply and an outlet for delivering odorant to the inlet of the pump. The system also includes a flow sensor that is placed within the pipeline to continuously monitor the actual flow rate of the gas. The odorant meter advantageously includes a transducer device for detecting odorant level in the meter, including a low level condition, as well as a temperature sensor for detecting temperature variations of the odorant therein. According to one feature of the invention, the transducer device continuously monitors the level of the odorant being used and cooperates with the controller and other sensor devices (including the pipeline flow sensor and the temperature sensor) to insure that a predetermined pump injection rate is maintained substantially constant over an operating period (which may be several days, weeks or months). As will be seen, the system monitors how much odorant is used per stroke and insures that the injection rate remains constant irrespective of such factors as pump efficiency variations, static pressure variations, equipment performance variations, line debris and variations in the density of the odorant, which variations or problems might otherwise cause inaccuracies in the measurement of odorant usage data and/or the fluctuation of the odorant injection rate.

According to another feature of the present invention, an auxiliary audit computer is provided or suitably-programmed to facilitate the processing and presentation of raw odorant usage data collected from the injection system. The audit computer cooperates with a monitor module and is designed to be connected to the controller via an RS-232, parallel or similar interface. The module includes appropriate storage devices, such as electrically-erasable programmable read only memories, which store data collected by the controller. Time stamp data is also provided by the controller for the various system events (e.g., number of pump strokes, amount of odorant injected in pounds, parameter changes, gas flow, etc.) and stored in the module. Thus the module provides a convenient store of the date and time of each particular operational event in the system. If the available memory in the module is used up, new data is preferably written over the oldest data such that when the module is read only the most recent usage data will be present.

Although not meant to be limiting, preferably the audit computer is a general purpose personal computer running a Windows-based graphical user interface. The module preferably collects data from the controller over a period of time, such as several months. The module is removed from the enclosure at periodic intervals and the data therein downloaded to the audit computer. Alternatively, a telephone or other suitable telecommunications connection can be provided to the enclosure to enable the collected data to be downloaded via a telephone link or the like. The audit computer is suitably programmed to receive the collected data and to calculate such variables as hourly odorant usage (HOU), daily odorant usage (DOU), the number of alarms generated, the average odorant injection rate, the low and high injection rates, the total odorant used, and the like. Based on such information, the audit computer can then be controlled to generate a table of such information, which can then be displayed on the CRT of the computer or printed out on an associated printer device.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a full understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a representative summary table of odorant usage event data generated by the audit computer according to the invention; and FIG. 7 is a representative system parameter table generated from the table in FIG. 6.

Similar reference characters refer to similar parts or steps throughout the several views of the drawings.

DETAILED DESCRIPTION

The present invention describes an "odorant" injection system wherein odorant is injected into a gas pipeline or the like for enabling operators to determine the presence of gas leaks. While the preferred embodiment of the invention relates to "odorant" injection, it should be readily appreciated by those of ordinary skill that the techniques and systems of the invention are readily applicable to other applications wherein it is desirable to inject a monitoring chemical into a fluid (whether liquid or gas) to thereby facilitate collection of quantitative data for analysis, adjustment and accountability. Examples of such alternative applications include, without limitation, injection of corrosion inhibitors, fuel additives, lubricants and other chemicals into pipelines or other gas or liquid conduits.

The present invention provides a total system approach to odorant injection, metering and monitoring to facilitate collection by pipeline operators and others of detailed quantitative data. The injection system is extremely reliable, requires little or no maintenance, is preferably solar-powered and can be left unattended in harsh environments for long periods of time. According to one important feature of the invention, the system monitors how much odorant is used per pump stroke and insures that the odorant injection rate remains constant irrespective of environmental or equipment variations which might otherwise cause inaccuracies in the measurement of odorant usage data and/or the fluctuation of the odorant injection rate.

Figure 1:
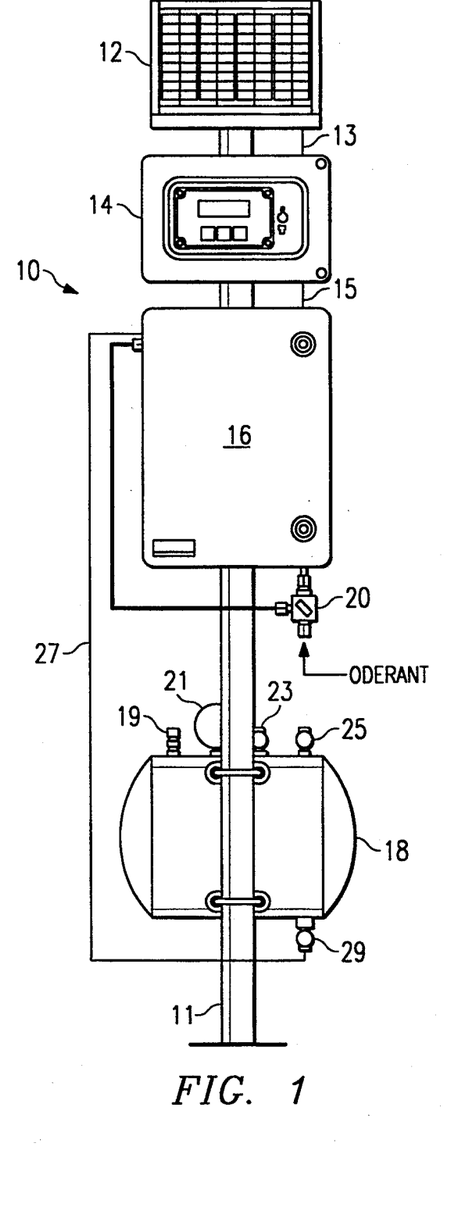
FIG. 1 is an elevation view of the preferred support structure of the invention for use in supporting the various components of the injection system.

Referring now to FIG. 1, an elevation view is shown of the basis physical components of the system. As can be seen, the system 10 is designed to be extremely portable and compact. The system 10 is preferably mounted on a support pole 11 supported in the ground adjacent the gas pipeline to be monitored. Viewed from the top, the system includes a solar panel enclosure 12, a system control enclosure 14, a mechanical enclosure 16 and a gas expansion tank 18. An odorant inlet filter assembly 20 is also shown. Filter assembly 20 connects to an odorant source as will be explained. One or more of the enclosures 12, 14, 16 and 18 may be combined into a single integrated housing, and the solar panel may be remotely located from the remainder of the system 10. Of course, any suitable power source (such as A.C) may be used instead of or to supplement the solar powered assembly. However, since the system 10 is generally used outdoors in remote locations and remains unattended, solar power is preferred.

The solar panel enclosure 12 supports a solar panel that converts solar energy to electrical energy that is coupled to a battery supported in system control enclosure 14 via electrical connector 13. As will be described, the system control enclosure supports the battery and a microprocessor-based controller unit for controlling the operation of the system. Control and data signals are routed between the controller unit and the mechanical enclosure 16 via the electrical connector 15. The mechanical enclosure 16 supports the various mechanical elements of the system used to control odorant injection and metering. These elements include the pump and odorant inlet meter as will be described. The expansion tank 18 is designed to be mounted close to the mechanical enclosure 16 and acts as a pressure source/receiver for the odorant inlet meter. The expansion tank includes a relief valve 19, a pressure gauge 21, a vent valve 23 and an expansion tank isolation valve 25. The odorant meter is connected via conduit 27 to a bottom port 29 of the expansion tank 18.

Figure 2:
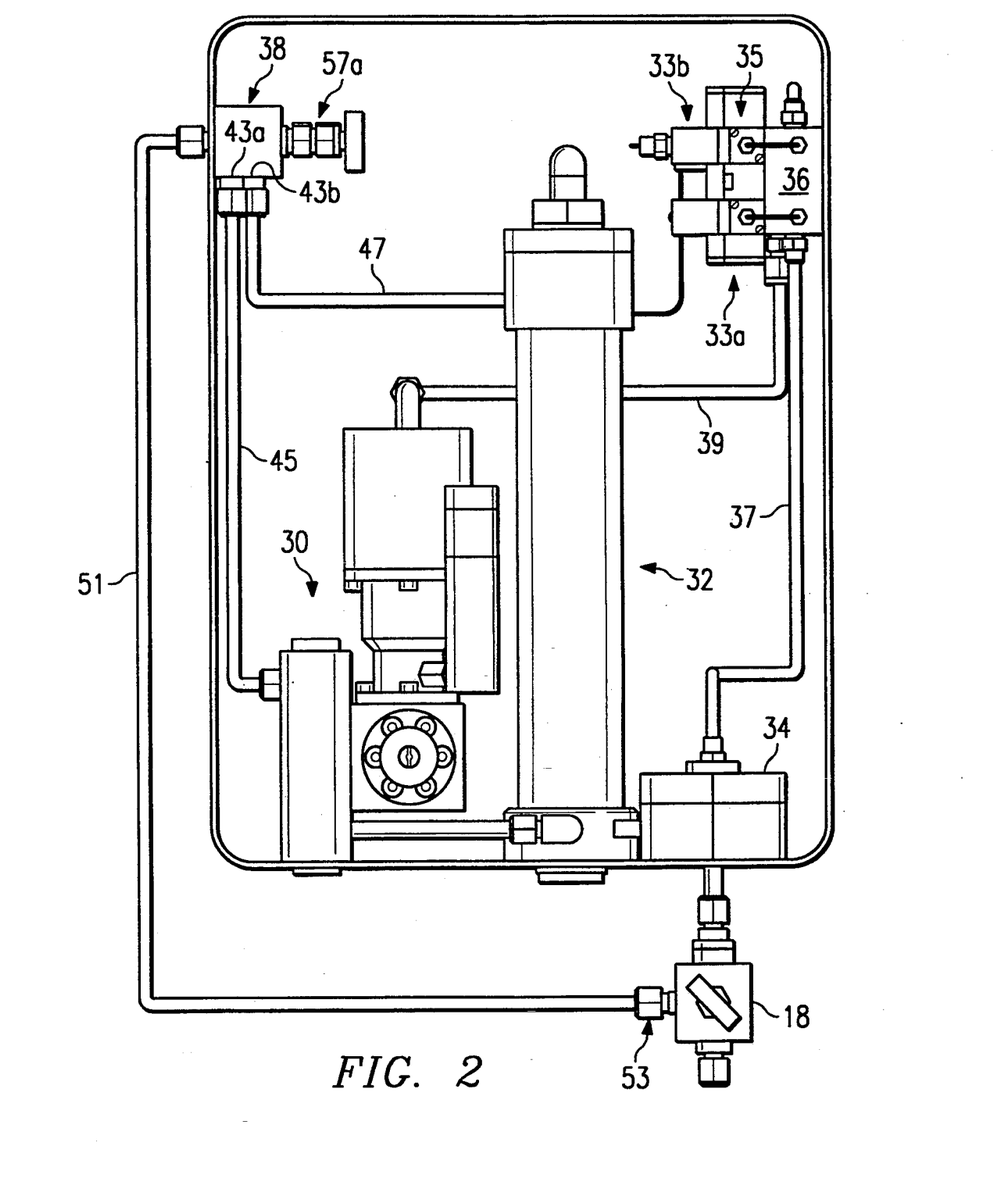
FIG. 2 is an elevation view of the mechanical enclosure of the system with an access door removed.

Turning now to FIG. 2, a detailed view is shown of the mechanical enclosure 16 with an access door removed. The enclosure 16 supports two main components of the system 10, the pump 30 and the inlet meter 32. As will be described in detail, the pump 30 injects an exact quantity of odorant at a rate determined by the controller unit. The meter 32 serves as a temperature compensated meter which verifies the amount of odorant injected by the pump.

The pump is preferably a pneumatically-actuated, positive displacement, reciprocating plunger pump. The pump is actuated with compressed air or pipeline gas at a pressure of about 40 psi. The pump has an adjustable displacement of 0–8.0 cc. and achieves proportional-to-flow injection through adjustment of the stroke rate. One such pump is described in U.S. Pat. No. 5,032,063, which is incorporated herein by reference, assigned to the assignee of the present invention and sold under the Model No. NJEX 7000. Each time the pump is stroked, a plunger displaces hydraulic fluid against a pump diaphragm which in turn displaces odorant through a discharge check valve. The pump diaphragm acts as an isolation device between the hydraulic fluid and the odorant, minimizing the risk of odorant escape. While this particular pump offers significant advantages and is preferred, it should be appreciated that any type of positive displacement pump can be used for the pump 30 of the system 10.

Figure 3:
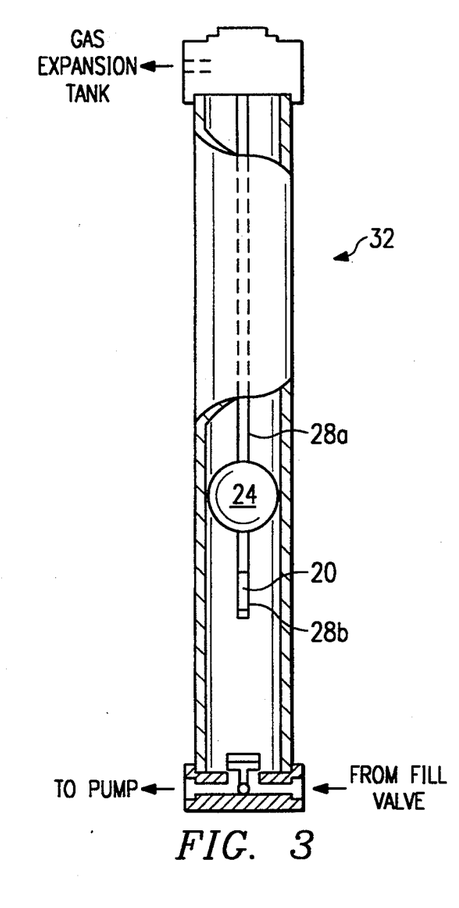
FIG. 3 is an elevation, partially cutaway, of the odorant meter.

Referring briefly to FIG. 3, an elevation view, partially cutaway, is shown of the odorant meter 32. As noted above, this device is used to meter a predetermined amount of odorant and to provide the controller unit with information about how efficiently the pump 30 is pumping. The meter is refilled after a predetermined amount of odorant is metered thereby to the pump. To this end, the meter includes a central stem 22 upon which a float 24 is mounted. The float is designed to ride on the stem as to track the volume of odorant in the meter. Movement of the float to a predetermined lower position will generate an electrical signal identifying that the meter needs to be refilled. As will be described, this signal is delivered to the controller, which in turn activates several valves to cause refilling of the meter from the odorant supply.

The meter 32 advantageously includes a detection device such as a level transducer 28a for continuously monitoring the level of odorant in the meter and generating an electrical signal proportional thereto. One suitable transducer is a linear displacement transducer (LDT) made by MTS of Research Triangle Park, N.C., although any suitable displacement transducers may be used. A temperature sensor 28b is also provided for generating an electrical signal proportional to temperature of the odorant within the meter. One suitable device is a two terminal monolithic integrated circuit temperature transducer (e.g., Model AD592 from Analog Devices) that provides an output proportional to absolute temperature. As will be described, the signals from the transducers 28a and 28b are provided to the controller unit to facilitate the calculation of the actual amount of odorant provided per pump stroke and to insure that the pump injection rate is maintained constant despite variations in pump efficiency, flow rate variations, odorant density fluctuations, line debris and other environmental, mechanical, hydraulic and electrical disturbances.

Referring briefly back now to FIG. 2, the odorant inlet filter assembly 18 is located below the enclosure 16 and filter's the system's odorant supply. Assembly 18 also supports an odorant filter element and an odorant return valve. The mechanical enclosure 16 also includes several other components including a fill valve 34, an actuation gas manifold 36 and an odorant discharge manifold 38. The fill valve 34 controls odorant flow into the meter 32.

The actuation gas manifold 36 houses an actuation gas supply connection and a pneumatic exhaust connection for the system. Actuation gas for the pump 30 may be provided by pipeline gas bled from the pipeline being odorized or from a source of compressed air. The manifold also supports a pair of solenoid valves 33a–b. One valve actuates the fill valve 34 via the conduit 37 and the other valve actuates an air relay valve 35 which in turn activates the pump 30 via conduit 39 to discharge the odorant. By using the solenoid valve and the air relay valve in series to stroke the pump, the advantages of low power consumption and rapid actuation gas delivery are provided by the system.

Figure 2A:
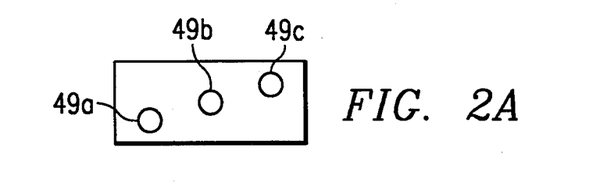
FIG. 2A is a view of the odorant discharge manifold connections.

The odorant discharge manifold 38 has two inlet connections 43a and 43b. Inlet 43a receives pump discharge via conduit 45. Inlet 43b is connected to the meter 32 via conduit 47. The odorant discharge manifold 36 includes three outlet ports 49a–c, shown in the partial side view in FIG. 2a. Port 49a receives a bypass conduit 51 connected between the port and an outlet 53 of the odorant inlet filter assembly. Port 49b is the pipeline connection pipe which delivers the pumped odorant to the pipeline. Port 49c receives the conduit 27 (shown in FIG. 1) connected between the port and the expansion tank bottom port 29. As seen in FIG. 2, the odorant discharge manifold 36 includes a valve 57a for controlling the flow of the odorant through the manifold. A purge valve is also provided. These valves are normally closed.

Figure 4:
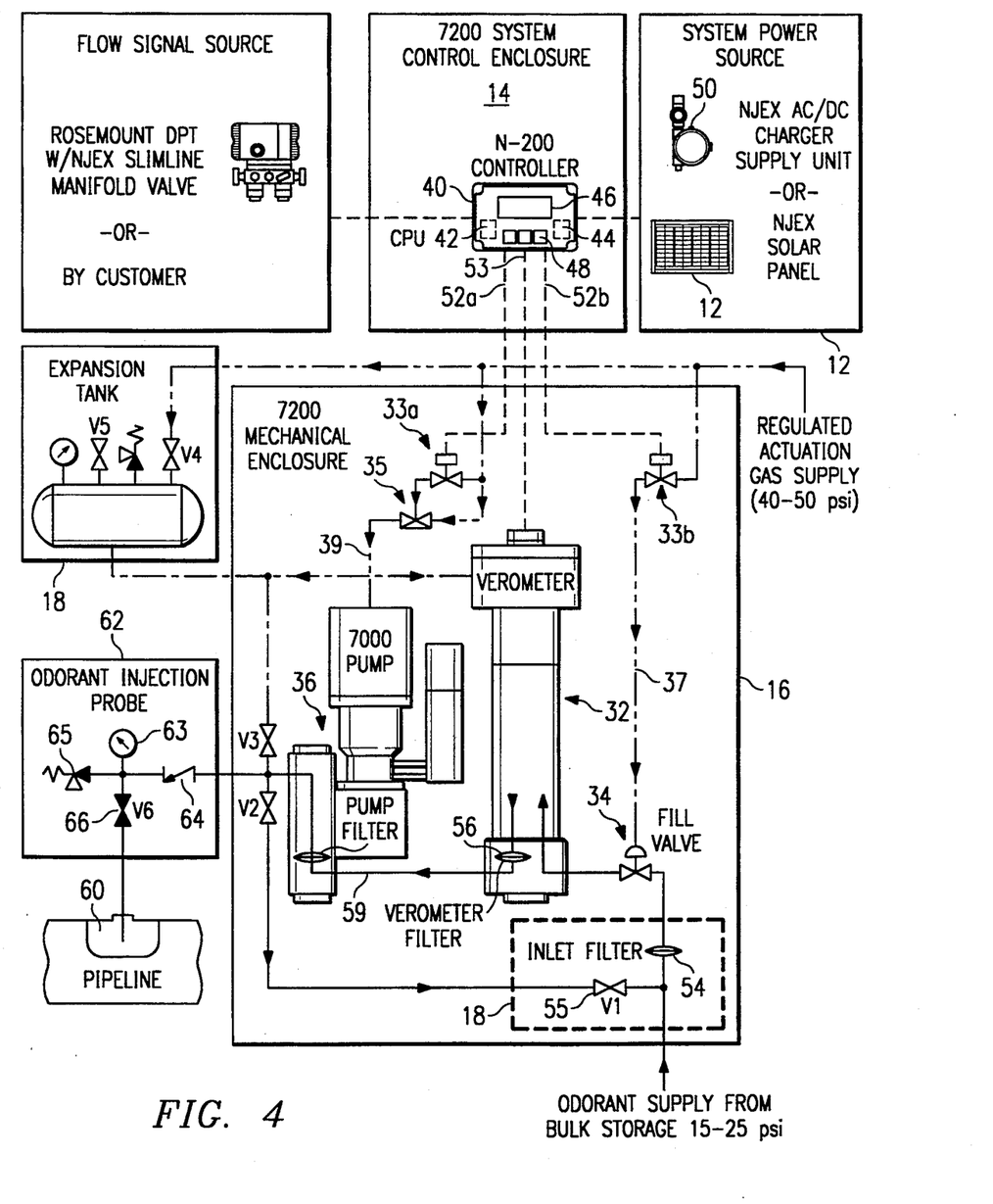
FIG. 4 is a detailed block diagram of the preferred odorant injection system configuration of the invention.

Referring now to FIG. 4, a detailed schematic diagram is shown of the system. Components previously identified are designated with the same reference numerals. Operation of the systems centers around the three primary components: pump 30, meter 34 and controller unit 40. The controller unit 40 is preferably a digital controller having a digital signal processor 42, suitable random access and read only memory 44, display 46, keyboard 48 and suitable input/output connections. The processor operates under the control of a software program to effect the various control functions described below. One of ordinary skill in the computer programming art may program the digital processor, using conventional programming languages, to provide these functions. Other input/output devices, such as a printer, may also be provided if desired.

The controller unit is powered by the solar panel assembly 12 through the battery. Alternatively, a charger unit 50 may be provided for direct electrical power through a conventional A.C. outlet. The controller unit 40 receives a flow input signal from either a flow computer (not shown) or some other flow monitoring device such as a differential pressure transducer. One such transducer is sold by Rosemount of Eden Prairie, Minn. The controller unit has two outputs 52a–b, and one input 53 provided by the meter 32. Output 52b generates a control signal to control solenoid valve 33b, which actuates fill valve 34 via the conduit 37. Output 52a generates a control signal that actuates solenoid valve 33a, which controls air relay valve 35; this in turn activates the pump 30 via conduit 39 to stroke the pump to discharge the odorant. A regulated actuation gas supply (between 40–50 psi) such as instrument air or pipeline air. Such gas is supplied to the valves 33a and 33b to control the fill valve and the pump.

As also seen in FIG. 4, the odorant supply is passed through an inlet filter 54, through the fill valve and into the odorant meter. The inlet filter and an odorant return valve 55 are supported in the filter assembly 18. The meter also includes an odorant filter 56, through which the odorant passes on its way to the pump 20. Odorant is delivered to the pump 20 from the meter via conduit 59. The odorant is preferably injected into the pipeline 60 via an odorant injection probe 62. The probe 62 includes a gauge 63, a check valve 64, a pressure relief valve 65, and a normally open valve 66. The remainder of the connections have been previously described. When the pump is actuated (via valves 33a and 35), a predetermined amount of odorant is provided to the probe 62 and then to the pipeline.

In particular, during normal operation the pump 30 injects an exact quantity of odorant at a rate determined by the controller unit 40. The quantity of odorant injected per stroke is set by the operator using a volume adjustment knob located on the front of the pump. The rate at which the pump is actuated is determined by the controller. More specifically, the controller unit 40 allows the system to operate in either a time-based mode or a proportional-to-flow mode. In the time-based mode of operation, the controller actuates the pump at a regular time interval preset by the operator. In the proportional-to-flow mode of operation, the controller uses the gas flow rate input signal and several operator input values to calculate the time between strokes of the pump. These operator input values or parameters are entered via the controller keyboard in a conventional manner (such as through use of a prompting scheme or operator instructions). These values include, without limitation, the desired injection rate (lbs/MMSCF), the pump displacement (cc/stroke), and the odorant density (lbs/gal). The injection rate is the desired amount of chemical (xx.xx lbs.) to be injected per million standard cubic feet of gas. The pump displacement is the amount of chemical displaced (xx.xx cc) at each stroke of the pump. The chemical density is the weight in lbs of one gallon of chemical being injected at 20 degrees centigrade.

According to the present invention the injection system is used to inject the chemical, e.g., the odorant, into the gas pipeline at a predetermined rate which as noted above is preferably set in pounds per million standard cubic feet (MMSCF) of gas. Significantly, during the proportional-to-flow operation, the controller unit allows the system the ability to maintain the set injection rate (in lbs/MMCF) even though there are variations in gas pipeline flow, odorant density, actual pump displacement or other such variations. This operation can be seen by considering the following formula:

Pump Stroke Rate (sec/stroke) =

$$\frac{\text{Pump Displacement} \atop \text{(cc/stroke)} \times \text{Chemical Density} \times (.951123) \atop \text{(lbs/gallon)}}{\text{Injection Rate} \atop \text{(lbs/MMSCF)} \times \text{Actual Flow Rate} \atop \text{(MMSCF/hr)}}$$

The Injection Rate, the Pump Displacement and Chemical Density are user-settable parameters. The Actual Flow Rate is sensed by the flow monitoring device in a conventional manner. The value (0.951123) is a conversion constant.

As can be seen by solving the above equation for Injection Rate, it is possible to selectively alter, or adjust for variations in, one or more other variables to insure that the Injection Rate can be maintained constant. This is one of the important functions of the controller unit of the present invention. Thus, for example, as temperature variations sensed by sensor 28b alter the Chemical Density of the odorant, the Injection Rate changes (assuming all other variables remain constant). Likewise, variations in the Actual Flow Rate alter the Injection Rate (if all other variables remain constant). Further, using transducer 28a the controller unit monitors the actual odorant leaving the meter and compares this value to the preset Pump Displacement to determine the actual Pump Displacement, which may vary over time due to pump efficiency variations or the like. Thus while the Pump Displacement may be set for 1.0 cc/stroke, the comparison of the transducer 28a output and the expected pump output (measured in number of strokes × the preset Pump Displacement) might indicate some variation in the actual Pump Displacement. This variation will also impact the Injection Rate (all other variables being constant).

Thus according to the invention the controller unit continually monitors the actual Pump Displacement (as calculated by comparing the transducer 28a output and the expected pump output), the Chemical Density (as calculated from the transducer 28b output), and the Actual Flow Rate, and in response thereto generates a control signal for controlling the rate at which the pump is stroked to thus maintain the preset injection rate. By using the actual odorant value and correcting for temperature (and thus density) and flow rate variations, the controller provides dynamic and real-time control over the injection system which has heretofore been unavailable in such systems.

The flow input signal is provided by either a flow computer or other flow monitoring device. In the proportional-to-flow operative mode, the controller 40 distinguishes between a low flow situation and a loss of flow input signal. In the event of a loss of flow signal, the controller unit automatically defaults back to a preselected percentage of the flow input. The flow input signal is read by the controller preferably eight times per pump stroke. These readings are averaged and the time duration until the next stroke is then calculated by the controller.

The meter 32 thus advantageously serves to meter the odorant into the pump and also to monitor the actual pump displacement. This is achieved through the level transducer 28a which measures the exact odorant displaced from the meter, a value which can then be continuously compared to the expected pump output (in preset cc/strokes × a number of strokes) to determine the true pump efficiency over a period of time. By monitoring true pump displacement that varies over time (as well as odorant density and actual flow rate), the system compensates for environmental and other factors by altering the stroke rate of the pump to maintain the preset injection rate constant. The meter 32 serves as a monitoring and metering device which facilitates the verification of the actual amount of odorant injected by the pump, and this value is then selectively and continuously used to alter the pump stroke rate as needed.

The controller unit 40 receives the various signals at input 53 from the meter provided over the electrical connector 68, which preferably includes a number of conductors. One conductor is connected to the meter level transducer and signals the controller unit when the odorant level has fallen below a predetermined level. As noted above, the controller responds to this condition by actuation of solenoid valve 33a and the fill valve. The other conductors are connected to the level transducer 28a and the temperature transducer 28b. These signals are provided to the controller to facilitate precise calculation of the odorant injected as described above.

Thus the invention facilitates the calculation of the precise amount of odorant injected. Prior art systems merely provided a coarse value for the odorant injected because they did not take into consideration the effects of pump efficiency variations, flow rate, temperature and the like.

As also seen in FIG. 4, the upper portion of the meter is connected to the gas expansion tank to enable gas, which would otherwise be entrained in the odorant, to bubble off. The entire odorant injection system thus operates in a closed loop manner to provide precise control of odorant injection, metering and monitoring. This closed loop operation is provided because as the meter (which is a sealed tube) is filled, the air within the meter is delivered into the gas expansion tank. As the odorant level is decreased, the displaced air is drawn back into the meter to maintain a static pressure.

According to another important feature of the present invention, the system include an auxiliary audit system which operates in conjunction with the controller unit to facilitate accurate and detailed reporting of how the system has operated over an extended period of time. The audit system 80 is shown schematically in FIGS. 5A and 5B and includes an audit controller 82 and a removable monitor module 84. Module 84 is designed to be connected to the controller unit 40 via an RS-232, parallel or similar interface 85. The module includes appropriate storage devices, such as electrically-erasable programmable read only memories, which store data collected by the controller unit 40. Time stamp data is also provided by the unit 40 for the various system events (e.g., alarms, total pump strokes, total pounds injected, etc.) and stored in the module. Thus the module provides a convenient store of the date and time of each particular operational event in the system. If the available memory in the module is used up, new data is preferably written over the oldest data such that when the module is read only the most recent usage data will be present.

Figure 5A:
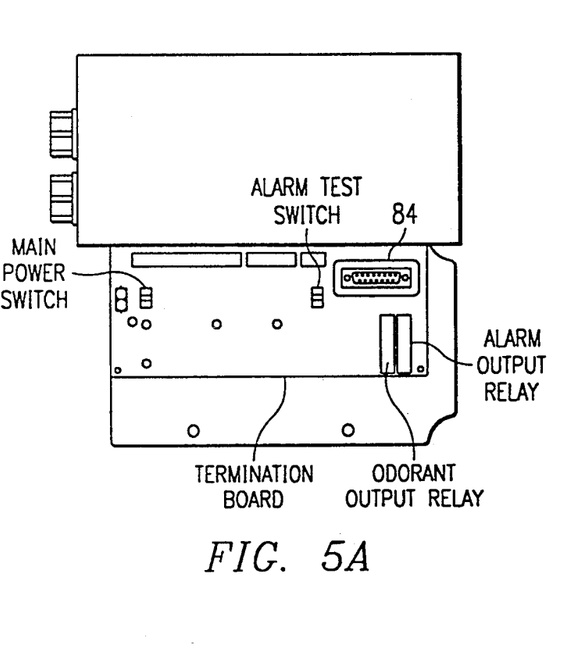
FIGS. 5A and 5B are a block diagram of the auxiliary audit system of the present invention.
Figure 5B:
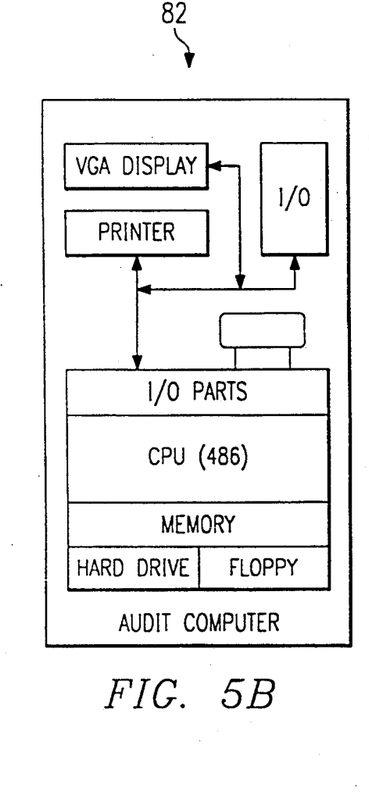

Although not meant to be limiting, preferably the audit controller 82 is a general purpose personal computer running an MS-DOS operating system with Microsoft Windows Version 3.1 or the like. Such a computer system is well known and provides a convenient graphical user interface (GUI) that cooperates with point and click or keyboard input devices in a well-known manner.

The module 84 preferably collects data from the controller unit 40 over a period of time, such as several months. The module is removed from the enclosure at periodic intervals and the data therein downloaded to the audit controller. Alternatively, a telephone or other suitable telecommunications connection can be provided to the enclosure to enable the collected data to be downloaded via a telephone link or the like. In the case of a telephone link, a modem is provided as is well known. The memory module may be integrated into the controller unit 40 instead of being a replaceable device. The audit controller is suitably programmed to receive the collected data and to calculate such variables as hourly odorant usage (HOU), daily odorant usage (DOU), the number of alarms generated, the average odorant injection rate, the low and high injection rates, the total odorant used, and the like. Based on such information, the audit controller can then be controlled to generate a table of such information, which can then be displayed on the CRT of the computer or printed out on a printer device. A hard disk, CD-ROM or other storage device is used to maintain the data (in raw or table format) to provide an audit trail for reporting purposes.

By way of example only, one such table generated by the audit controller is shown in FIG. 6. This report summarizes the data for a particular period defined by log start and end dates. By using function keys on the keyboard, the user can select different days or tag certain fields. For example, with the cursor located adjacent the DOU field, depression of the F1 function key allows the user to pull down a window showing HOU for the particular day. Depression of the F2 function key allows the operator to select a different date to generate a new table. Depression of the F3 key enables the operator to view the time and date of the next alarm condition after the day shown. If the F4 key is depressed, a window is created to allow the operator to view the system parameters for the time period in question. An example of a system parameter screen display is shown in FIG. 7.

The above-identified display screens are merely exemplary. The raw odorant usage data may be processed into any suitable record format to facilitate the presentation of the summary data.

It should be appreciated that the use of a dedicated audit controller provides significant audit and reporting capabilities for the system. The user can generate individual reports for each day of monitoring, and these reports can be manipulated and stored for future audit or reporting use. Precise hourly and daily odorant use data can be calculated, displayed and recorded to enable the operator to know exactly how the system is operating in the field. The invention thus facilitates the primary objectives of all gas odorization programs, namely to provide for the public welfare and safety, and to meet or exceed regulatory requirements.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A system for injecting odorant from an odorant supply into a gas pipeline at a desired injection rate, comprising:
   a pump having an inlet, and an outlet connectable to the gas pipeline, the pump having an adjustable stroke rate;
   a meter supporting a predetermined volume of odorant and having an inlet connected to receive odorant from the odorant supply and an outlet for delivering odorant to the inlet of the pump;
   a level transducer for continuously monitoring a level of odorant in the meter and generating an odorant level signal proportional thereto; and
   a controller operative under the control of a program stored therein and responsive to the odorant level signal for generating a control signal for selectively altering the stroke rate of the pump to maintain the injection rate substantially constant over a predetermined time period.

2. The odorant injection system as described in claim 1 further including;
   a flow rate transducer located in the gas pipeline for generating a flow rate signal proportional to the flow rate of the gas in the gas pipeline; and
   wherein the controller is also responsive to the flow rate signal to generate the control signal.

3. The odorant injection system as described in claim 1 further including;
   a temperature transducer located in the meter for generating a temperature signal proportional to the temperature of the odorant in the meter; and
   wherein the controller is also responsive to the temperature signal to generate the control signal.

4. The odorant injection system as described in claim 1 further including;
   a flow rate transducer located in the gas pipeline for generating a flow rate signal proportional to the flow rate of the gas in the gas pipeline; and
   a temperature transducer located in the meter for generating a temperature signal proportional to the temperature of the odorant in the meter; and
   wherein the controller is also responsive to the flow rate signal and the temperature signal to generate the control signal.

5. The odorant injection system as described in claim 1 further including an audit system for collecting odorant usage data.

6. The odorant injection system as described in claim 5 wherein the audit system includes a memory module for storing odorant injection event data, and an audit controller.

7. The odorant injection system as described in claim 1 further including means for supplying electrical energy to power the controller.

8. The odorant injection system as described in claim 4 wherein the means for supplying electrical energy is a solar panel.

9. The odorant injection system as described in claim 1 further including a gas expansion tank connected to the meter.

10. In a system for injecting odorant from an odorant supply into a gas pipeline, the system comprising a pump for injecting the odorant into the pipeline and a controller for controlling actuation of the pump, the improvement comprising:
    a memory module connectable to the controller for collecting odorant usage data over a predetermined period of time; and
    an audit computer for receiving the odorant usage data collected by the memory module and including:
      program control means for processing the odorant usage data to generate audit information including at least one of the following data types for the predetermined period of time; daily odorant usage (DOU) data, hourly odorant usage (HOU) data for each hour of a particular day corresponding to the DOU data, odorant injection rate data, and alarm data;
      display means for displaying at least some of the audit information in a first display format; and
      interface control means for selecting a data type while the audit information is displayed in the first format and in response thereto displaying some other of the audit information in a second display format.

11. A system for injecting a chemical from a chemical supply into a fluid conduit at a desired injection rate, comprising:
    a pump having an inlet, and an outlet connectable to the fluid conduit, the pump having an adjustable stroke rate;
    a meter supporting a predetermined volume of the chemical and having an inlet connected to receive the chemical from the chemical supply and an outlet for delivering the chemical to the inlet of the pump;
    a level transducer for continuously monitoring a level of the chemical in the meter and generating a level signal proportional thereto; and
    a flow rate transducer located in the fluid conduit for generating a flow rate signal proportional to the flow rate of the fluid in the fluid conduit;
    a temperature transducer located in the meter for generating a temperature signal proportional to the temperature of the chemical in the meter; and
    a controller operative under the control of a program stored therein and responsive to the level signal, the flow rate signal and the temperature signal for generating a control signal for selectively altering the stroke rate of the pump to maintain the injection rate substantially constant over a predetermined time period.

* * * * *